United States Patent [19]

Kleiman

[11] 3,868,426

[45] Feb. 25, 1975

[54] STABILIZED VINYLIDENE BROMIDE

[75] Inventor: Joseph P. Kleiman, Birmingham, Mich.

[73] Assignee: Ethyl Corporation, Richmond, Va.

[22] Filed: May 23, 1973

[21] Appl. No.: 363,071

[52] U.S. Cl............................ 260/652.5 P, 252/399
[51] Int. Cl............................................. C07c 17/40
[58] Field of Search................ 260/652.5 R, 652.5 P

[56] References Cited
UNITED STATES PATENTS 2,616,883  11/1952  Marons.......................... 260/86.3 X Primary Examiner—Howard T. Mars
Attorney, Agent, or Firm—Donald L. Johnson; Robert A. Linn

[57] ABSTRACT

Vinylidene bromide is stabilized by a conjugated butadiene such as isoprene.

3 Claims, No Drawings

STABILIZED VINYLIDENE BROMIDE

BACKGROUND OF THE INVENTION

British Pat. Specification No. 1,139,854 teaches stabilized vinylidene bromide with styrene.

SUMMARY OF THE INVENTION

This invention pertains to stabilized compositions of the following type: Vinylidene bromide stabilized with a stabilizing amount of a conjugated butadiene of from four to about 12 carbon atoms having the formula

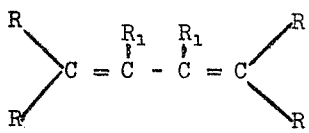

wherein R is selected from the class consisting of hydrogen and hydrocarbyl radicals of up to about eight carbons, and $R_1$ is selected from the class consisting of hydrogen, chlorine, bromine, and alkyl radicals of up to about eight carbon atoms, such that no more than one $R_1$ is halogen, said hydrocarbyl radicals being free from aliphatic unsubstitution.

A preferred embodiment is a stabilized vinylidene bromide composition in which the vinylidene bromide contains a small, but stabilizing amount of a stabilizer selected from isoprene, chloroprene, and 1,3-butadiene.

A more preferred embodiment comprises vinylidene bromide stabilized with isoprene.

DESCRIPTION OF PREFERRED EMBODIMENTS

This invention pertains to stabilization of vinylidene bromide, a brominated hydrocarbon which is susceptible to deterioration upon standing. Generally, any butadiene compound which stabilizes vinylidene bromide can be used in this invention. The preferred additives are soluble in the amounts employed. More preferably, the additives should have up to about 12 carbons and should not react or otherwise decompose, whereby the stabilization is diminished to an undesirable extent during the period for which stabilization is desired.

Below are listed non-limiting examples of hydrocarbyl groups which may be present in the above general formula as groups $R - R_1$.

Examples of alkyl groups represented by the groups $R - R_1$ in the above general formula are methyl, ethyl, n-propyl, isopropyl, n-butyl, isobutyl, sec-butyl, tert-butyl n-amyl, and the various positional isomers thereof, and likewise the corresponding straight and branched chain isomers of hexyl, heptyl, octyl, nonyl, decyl, undecyl, dodecyl, and the like.

When said groups $R - R_1$ are cycloalkyl groups, they may be cyclopropyl, cyclobutyl, cyclopentyl, cyclohexyl, cycloheptyl, cyclooctyl, cyclononyl, cyclodecyl, cycloundecyl, cyclododecyl, and the like. They may also be such cycloaliphatic groups as α-cyclopropylethyl, α-cyclobutylpropyl, and similar alkyl derivatives of the higher cycloalkyls.

When the groups $R - R_1$ are aralkyl groups, they may be benzyl, phenylethyl, 1-phenylpropyl, 2-phenylpropyl, 3-phenylpropyl, the 1- and 2-isomers of phenylisopropyl, the 1-, 3-isomers of phenylbutyl, and the like.

One of the $R_1$ groups may contain a non-hydrocarbon substituent such as —Cl or —Br, preferably chlorine.

Preferred stabilizers of this invention are isoprene, chloroprene, and 1,3-butadiene.

Although one stabilizer can be used, the halogenated hydrocarbon can be stabilized with mixtures of butadiene compounds of the type described above. Two, three of more butadiene compounds can be used as the stabilizer additive. A suitable mixture is isoprene and chloroprene.

A stabilizing amount of stabilizer is employed. The amount used can be varied and is dependent, at least to some extent, on the activity of the stabilizer. By tests, such as described below, stabilization achieved by various additive concentrations can be observed. With the data obtained, a skilled practitioner can select the desired concentration. In general, the amount of stabilizer is less than 20 weight per cent. A preferred concentration range is from about 0.5 to about 15 weight per cent; most preferably from about 1 to about 10 per cent by weight.

The stabilizer additive and vinylidene bromide can be admixed in any known manner.

EXAMPLE

Isoprene was added to a batch of 50 ml of freshly distilled vinylidene bromide so that the concentration of isoprene was about 7 weight per cent.

This mixture was divided into 10 vials, 5 of which were stored under nitrogen and 5 in air. All vials were stored in the dark at 110° F.

After 4 weeks, no evidence of polymer formation was apparent by visible inspection of any of the vials. In contrast, unstabilized vinylidene bromide begins polymerizing in a few minutes even when under nitrogen and cooled by an ice bath.

In a similar manner, 1-10 weight per cent of isoprene, chloroprene, 1,3-butadiene, 1,3-pentadiene, 1,3-dodecadiene, 1-cyclohexyl-1,3-butadiene, 2-cyclohexyl-1,3-butadiene, and 6-phenyl-1,3-butadiene also retard polymerization of vinylidene bromide.

The stabilizer-vinylidene bromide compositions of this invention can be stored under inert gases other than nitrogen; e.g. argon, neon, and the like.

I claim:

1. Vinylidene bromide stabilized with a stabilizing amount of less than 20 weight % of a conjugated butadiene of from four to about 12 carbon atoms having the formula

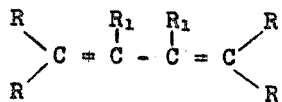

wherein R is selected from the class consisting of hydrogen and lower alkyl of up to eight carbons, and $R_1$ is selected from the class consisting of hydrogen, chlorine, bromine, and alkyl radicals of up to about eight carbon atoms, such that no more than one $R_1$ is halogen.

2. A composition of claim 1 wherein said conjugated butadiene is selected from the class consisting of isoprene, chloroprene, and 1,3-butadiene.

3. A composition of claim 2 wherein said butadiene is isoprene.

* * * * *